US012681039B2

(12) United States Patent
Dwyer et al.

(10) Patent No.: US 12,681,039 B2
(45) Date of Patent: Jul. 14, 2026

(54) TRANSLATIONAL MASS ACCELEROMETER

(71) Applicant: Honeywell International Inc.,
Charlotte, NC (US)

(72) Inventors: Paul W. Dwyer, Seattle, WA (US);
Stephen F. Becka, Nampa, ID (US)

(73) Assignee: Honeywell International Inc.,
Charlotte, NC (US)

( * ) Notice: Subject to any disclaimer, the term of this
patent is extended or adjusted under 35
U.S.C. 154(b) by 411 days.

(21) Appl. No.: 18/332,543

(22) Filed: Jun. 9, 2023

(65) Prior Publication Data

US 2024/0410914 A1 Dec. 12, 2024

(51) Int. Cl.
*G01P 15/08* (2006.01)
*G01P 15/125* (2006.01)

(52) U.S. Cl.
CPC ........ *G01P 15/125* (2013.01); *G01P 15/0802*
(2013.01); *G01P 2015/0814* (2013.01); *G01P*
*2015/0871* (2013.01); *G01P 2015/0882*
(2013.01)

(58) Field of Classification Search
CPC .............. G01P 15/125; G01P 15/0802; G01P
2015/0814; G01P 2015/0871; G01P
2015/0882; G01P 2015/0854; G01P
15/132
See application file for complete search history.

(56) References Cited

U.S. PATENT DOCUMENTS

| | | | | | |
|---|---|---|---|---|---|
| 5,226,321 | A | * | 7/1993 | Varnham | G01C 19/5684 |
| | | | | | 73/504.13 |
| 5,253,527 | A | * | 10/1993 | Yamaguchi | G01P 15/132 |
| | | | | | 73/514.24 |
| 5,373,736 | A | * | 12/1994 | Brown | G01P 5/248 |
| | | | | | 73/170.13 |
| 5,610,431 | A | * | 3/1997 | Martin | G01P 15/0802 |
| | | | | | 257/419 |
| 5,952,572 | A | * | 9/1999 | Yamashita | G01P 15/125 |
| | | | | | 73/504.04 |
| 5,955,800 | A | * | 9/1999 | Shearwood | H02K 7/09 |
| | | | | | 310/40 MM |
| 6,046,067 | A | * | 4/2000 | Werner | B81C 1/00293 |
| | | | | | 73/514.32 |
| 6,133,059 | A | * | 10/2000 | Werner | B81B 3/0013 |
| | | | | | 73/514.32 |

(Continued)

OTHER PUBLICATIONS

Response to Extended Search Report dated Sep. 30, 2024, from
counterpart European Application No. 24176255.8 filed Jan. 2,
2025, 31 pp.

(Continued)

*Primary Examiner* — David J Bolduc
(74) *Attorney, Agent, or Firm* — Shumaker & Sieffert,
P.A.

(57) ABSTRACT

An example Micro Electro-Mechanical Systems (MEMS)
accelerometer device includes a proof mass comprising at
least one of one or more isolated conductive coil traces or
one or more pick-off combs within the proof mass, the one
or more pick-off combs comprising a plurality of pick-off
comb tines; a pole-piece layer coupled to the proof mass;
and a return-path layer coupled to the proof mass, wherein
the at least one of the one or more isolated conductive coil
traces or the one or more pick-off combs are formed by
selective laser etching.

20 Claims, 9 Drawing Sheets

100

(56)  References Cited

U.S. PATENT DOCUMENTS

| 6,776,042 B2 | 8/2004 | Pike et al. |
| 7,479,402 B2 | 1/2009 | Yu |
| 7,984,648 B2 | 7/2011 | Horning et al. |
| 8,207,004 B2 | 6/2012 | Chen et al. |
| 8,307,710 B2 | 11/2012 | Dwyer et al. |
| 8,365,596 B2 | 2/2013 | Dwyer et al. |
| 8,593,155 B2 | 11/2013 | Sparks et al. |
| 8,766,745 B1 | 7/2014 | Kubena et al. |
| 9,689,888 B2 | 6/2017 | Becka |
| 10,067,154 B2 | 9/2018 | Spivak |
| 10,352,960 B1 | 7/2019 | Shcheglov et al. |
| 10,422,811 B2 | 9/2019 | Malvern et al. |
| 10,571,485 B2 | 2/2020 | Durston et al. |
| 10,866,258 B2 | 12/2020 | Reinke |
| 10,884,020 B2 | 1/2021 | Malvern et al. |
| 10,988,375 B1 | 4/2021 | English et al. |
| 11,287,441 B2 | 3/2022 | Reinke |
| 2002/0033048 A1* | 3/2002 | McIntosh ............. G01D 5/2417 361/115 |
| 2003/0180504 A1* | 9/2003 | Yoshida ............. G01C 19/5755 428/172 |
| 2004/0216523 A1* | 11/2004 | Lehtonen ................ G01P 15/18 73/514.32 |
| 2006/0145059 A1* | 7/2006 | Lee ......................... H04R 23/00 250/214 R |
| 2007/0016026 A1* | 1/2007 | Thomenius .......... G10K 11/341 600/437 |
| 2007/0145002 A1* | 6/2007 | Street .................. H01L 21/0271 216/2 |
| 2007/0209437 A1* | 9/2007 | Xue ...................... G01P 15/105 73/514.31 |
| 2007/0214885 A1* | 9/2007 | Chernyak ............. G01P 15/132 73/514.36 |
| 2009/0235745 A1* | 9/2009 | Dwyer .................... G01P 15/11 73/514.23 |
| 2010/0083760 A1* | 4/2010 | Dwyer ................. G01P 15/125 73/514.31 |
| 2010/0083761 A1* | 4/2010 | Dwyer ................. G01P 15/132 73/514.31 |
| 2010/0170341 A1* | 7/2010 | Dwyer ................. G01P 15/132 73/514.31 |
| 2011/0005318 A1* | 1/2011 | Dwyer ................ G01P 15/0802 73/514.31 |
| 2011/0105955 A1* | 5/2011 | Yudovsky ........... G01P 15/0802 600/595 |
| 2013/0001710 A1* | 1/2013 | Daneman ........... G02B 26/0833 257/415 |
| 2015/0042359 A1* | 2/2015 | Onaran .................. G01B 11/00 324/629 |
| 2015/0183635 A1* | 7/2015 | Lee ..................... B81C 1/00547 257/419 |
| 2015/0375995 A1* | 12/2015 | Steimle .............. B81C 1/00238 438/51 |
| 2017/0115321 A1* | 4/2017 | Dwyer ................. G01P 15/125 |
| 2017/0363424 A1* | 12/2017 | Maspero ............ G01C 19/5762 |
| 2018/0029160 A1* | 2/2018 | Goodman ............. G01P 15/125 |
| 2018/0113146 A1* | 4/2018 | Najafi .................. G01P 15/125 |
| 2018/0217179 A1* | 8/2018 | Harish .................. G01P 15/125 |
| 2019/0360323 A1* | 11/2019 | Jung ...................... E21B 47/017 |
| 2021/0345939 A1* | 11/2021 | Jumbe ................... H04R 1/028 |
| 2022/0003551 A1* | 1/2022 | Feshali .................. G02B 6/132 |
| 2022/0090917 A1 | 3/2022 | Najafi et al. |
| 2023/0067030 A1 | 3/2023 | Fell et al. |
| 2023/0349944 A1* | 11/2023 | Kienitz ................... G01P 15/18 |
| 2023/0364715 A1* | 11/2023 | Milne ................. B23K 26/362 |
| 2023/0366909 A1* | 11/2023 | Milne .................. G01P 15/097 |

OTHER PUBLICATIONS

Ardakani, "Development of 3D High-Q Fused Quartz Micro Structures for Precision Coriolis Vibratory Gyroscopes", University of California Irvine, Retrieved from: https://escholarship.org/content/qt83z1x9nq/qt83z1x9nq_noSplash_76b260da53284859218fca4a4284e77b.pdf, Dec. 31, 2019, 195 pp.

Gottmann et al., "Selective Laser-Induced Etching of 3D Precision Quartz Glass Components for Microfluidic Applications—Up-Scaling of Complexity and Speed", Micromachines, vol. 8, No. 4, Retrieved from: https://www.mdpi.com/2072-666X/8/4/110, Apr. 1, 2017, 10 pp.

Mohammed et al., "Monolithic Multi Degree of Freedom (MDoF) Capacitive MEMS Accelerometers", Micromachines, vol. 9, No. 11, Retrieved from: https://www.researchgate.net/publication/329007197_Monolithic_Multi_Degree_of_Freedom_MDoF_Capacitive_MEMS_Accelerometers, Nov. 16, 2018, 20 pp.

Nagourney, "High-Q Fused Silica Micro-Shell Resonators for Navigation-Grade MEMS Gyroscopes", University of Michigan Library, Retrieved from: https://deepblue.lib.umich.edu/handle/2027.42/146096, filed Dec. 31, 2018, 182 pp.

Qu et al., "Design and Characterization of a Fully Differential MEMS Accelerometer Fabricated Using MetalMUMPs Technology", Sensors, vol. 13, No. 5, Retrieved from: https://www.mdpi.com/1424-8220/13/5/5720, May 2, 2013, 17 pp.

Rao et al., "A MEMS Micro-g Capacitive Accelerometer Based on Through-Silicon-Wafer-Etching Process", Micromachines, vol. 10, No. 6, Retrieved from: https://www.mdpi.com/2072-666X/10/6/380, Jun. 7, 2019, 14 pp.

Singh, "Fused Silica Precision Shell Integrating (PSI) Navigation-Grade Micro Gyroscopes", The University of Michigan, Retrieved from: https://deepblue.lib.umich.edu/bitstream/handle/2027.42/163311/sajals_1.pdf?sequence=1, Dec. 31, 2020, 193 pp.

Extended Search Report from counterpart European Application No. 24176255.8 dated Sep. 30, 2024, 11 pp.

Linden et al., "Femtosecond laser-assisted fabrication of piezoelectrically actuated crystalline quartz-based MEMS resonators", Microsystems & Nanoengineering, vol. 9, No. 1, Mar. 30, 2023, 1-12 pp.

Vieu et al., "Electron beam lithography: resolution limits and applications", Applied surface science, vol. 164, No. 1-4, Sep. 1, 2000, 111-117 pp.

Notice of Intent to Grant and Text Intended to Grant from counterpart European Application No. 24176255.8 dated Jan. 16, 2026, 57 pp.

\* cited by examiner

TRANSLATIONAL MASS ACCELEROMETER

TECHNICAL FIELD

The present disclosure relates to an in-plane micro electro-mechanical systems (MEMS) accelerometer device.

BACKGROUND

Force-balance accelerometers use differential capacitance of a proof mass with capacitor plates on either side interacting with ground planes formed by flat surfaces on magnetic return paths to close a servo loop and output current proportional to applied acceleration.

SUMMARY

The disclosure describes an improved in-plane MEMS accelerometer device and techniques for making such MEMS accelerometer devices. For example, an in-plane MEMS accelerometer device may comprise a quartz substrate, such as a fused quartz substrate. The quartz substrate may comprise a proof mass including one or more isolated conductive coil traces and/or one or more pick-off combs within the proof mass, with the pick-off combs including pick-off comb tines. The one or more isolated conductive coil traces may be formed by selective laser etching. The one or more pick-off comb tines of the pick-off combs may also be formed by selective laser etching.

In some examples, forming one or more isolated conductive coil traces and/or pick-off comb tines of the one or more pick-off combs by selective laser etching may increase a respective density of the respective isolated conductive coil traces and/or pick-off comb tines of the one or more pick-off combs within the proof mass, which may reduce or remove nonlinearities to improve the precision of the navigation of the in-plane MEMS accelerometer device.

For example, forming pick-off comb tines of the one or more pick-off combs by selective laser etching and/or forming one or more isolated conductive coil traces within the proof mass by selective laser etching improves the precision of the navigation function of the MEMS accelerometer device by reducing the nonlinearities of the MEMS accelerometer device.

In some examples, the proof mass may be laser etched from a single, monolithic quartz substrate. In other examples, the proof mass assembly may comprise components separately made from the same material and subsequently attached without the use of additional materials. In some examples, the quartz substrate may be a fused quartz substrate. In some examples, the quartz substrate may be a crystalline quartz substrate, a monolithic quartz substrate, or a monolithic crystalline quartz substrate.

In some examples, the disclosure describes a Micro Electro-Mechanical Systems (MEMS) accelerometer device comprising: a proof mass comprising at least one of one or more isolated conductive coil traces or one or more pick-off combs within the proof mass, the one or more pick-off combs comprising a plurality of pick-off comb tines; a pole-piece layer coupled to the proof mass; and a return-path layer coupled to the proof mass, wherein the at least one of the one or more isolated conductive coil traces or the one or more pick-off combs are formed by selective laser etching.

In some examples, the disclosure describes a method comprising: selective laser etching one or more isolated conductive coil traces within a proof mass; and selective laser etching one or more pick-off combs within the proof mass, the one or more pick-off combs comprising a plurality of pick-off comb tines.

The details of one or more examples are set forth in the accompanying drawings and the description below. Other features, objects, and advantages will be apparent from the description and drawings, and from the claims.

DETAILED DESCRIPTION

Navigation systems and positioning systems rely on the accuracy of accelerometers to perform critical operations in various environments. Force-balance accelerometers use differential capacitance of a proof mass with capacitor plates on either side interacting with ground planes formed by flat surfaces on magnetic return paths to close a servo loop and output current proportional to applied acceleration. However, performance issues may arise due to the 1/D effect as the proof mass approaches the ground plane. In addition, in a high gravitational startup situation, the nonlinearities of force-balance accelerometers may degrade the precision of the navigation function.

In some examples, forming one or more isolated conductive coil traces and/or pick-off comb tines of the one or more pick-off combs by selective laser etching within the proof mass may increase a respective density of the respective isolated conductive coil traces and/or pick-off comb tines of the one or more pick-off combs within the proof mass, which may reduce or remove nonlinearities to improve the precision of the navigation of the in-plane micro electro-mechanical systems (MEMS) accelerometer device.

For example, forming pick-off comb tines of the one or more pick-off combs by selective laser etching and/or forming one or more isolated conductive coil traces within the proof mass by selective laser etching improves the precision of the navigation function of the MEMS accelerometer device by reducing the nonlinearities of the MEMS accelerometer device.

Figure 1:
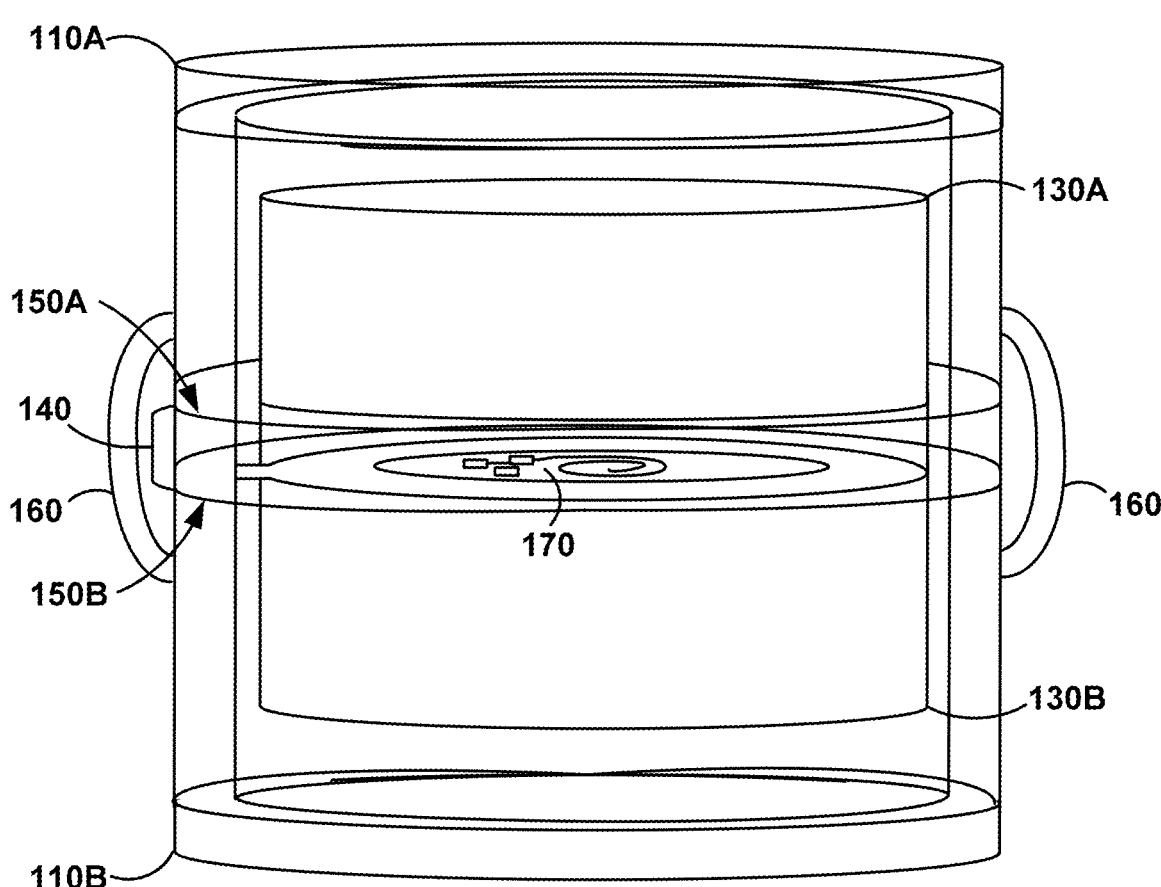
FIG. 1 is a conceptual three-dimensional drawing illustrating an example of an accelerometer, in accordance with one or more techniques of this disclosure.

FIG. 1 is a conceptual three-dimensional drawing illustrating an example accelerometer system 100, in accordance with one or more techniques of this disclosure. As illustrated in the example of FIG. 1, system 100 may include a first enclosure piece 110A, a second enclosure piece 110B, a first magnetic assembly piece 130A, a second magnetic assembly piece 130B, a proof mass 140, a mechanical bond 160, and electrical circuitry 170.

In some examples, first enclosure piece 110A and second enclosure piece 110B may be monolithic structures. First enclosure piece 110A and second enclosure piece 110B (collectively "enclosure 110") may be configured to enclose components of the accelerometer. For example, first enclosure piece 110A and second enclosure piece 110B may each have a cylindrical cup structure. First enclosure piece 110A may include a proximal end that forms a base of the cup structure defined by first enclosure piece 110A. A proximal end of second enclosure piece 110B may include a circular rim of the cup structure defined by second enclosure piece 110B. First enclosure piece 110A may include a distal end that forms the circular rim of the cup structure defined by first enclosure piece 110A. A distal end of second enclosure piece 110B may be defined by a base of the cup structure defined by second enclosure piece 110B. First enclosure piece 110A and second enclosure piece 110B may each include an inner face and an outer face. The inner face may include any face or portion of a face on a concave portion of the cup structure. The outer face may include any face or portion of a face on a convex portion of the cup structure.

In some examples, first magnetic assembly piece 130 and second magnetic assembly piece 110B (collectively "magnetic assembly 110") may each form cylindrical cup structures. While enclosure 110 may be used to transfer the location of the stress, magnetic assembly 110 may provide magnetic fields in proximity to the coils to produce the Lorentz force for servo loop closure.

An outer face of first magnetic assembly piece 130A may include any face or portion of a face on a concave portion of the cup structure defined by first magnetic assembly piece 130A. An outer face of second magnetic assembly piece 130 may include any face or portion of a face on a concave portion of the cup structure defined by second magnetic assembly piece 130B. An inner face of first magnetic assembly piece 130A may include any face or portion of a face on a convex portion of the cup structure defined by first magnetic assembly piece 130A. An inner face of second magnetic assembly piece 130B may include any face or portion of a face on a convex portion of the cup structure defined by second magnetic assembly piece 130B.

Enclosure 110 may be configured to enclose a first magnetic assembly piece 130A, and a second magnetically assembly piece (collectively "magnetic assembly 130") by coupling enclosure 110 to proof mass 140. For example, proof mass 140, having a proximal face, may be coupled to the distal face of first enclosure piece 110A forming a first joint 150A. Proof mass 140 having a distal face, may be coupled to the proximal face of second enclosure piece 110B forming a second joint 150B. An outside ring of proof mass 140 may form first joint 150A with first enclosure piece 110A, and second joint 150B with second enclosure piece 110B. In some examples, a mechanical bond may be formed across first joint 150A and the second joint 150B. In some examples, first joint 150A and second joint 150B may be bonded with a quartz-to-quartz laser weld using selective laser-induced etching (SLE) technology.

Coupling enclosure 110 to proof mass 140 also protects some electrical circuitry of the accelerometer from damage. For examples, electrical circuitry, including a torquer coil, may be coupled to the proof mass. In some examples, the electrical circuitry may be oriented on a middle portion of the proof mass, mechanically coupled to the ring of the proof mass by one or more flexures. Coupling enclosure 110 to proof mass 140, (e.g., the ring of proof mass 140) allows the movement of magnetic assembly 130 to be isolated from temperature strain introduced by enclosure 110.

The electrical circuitry may be configured to generate an electrical signal based on an acceleration experienced by accelerometer system 100. For example, in some configurations accelerometer system 100 may include a force rebalance accelerometer, in which the electrical signal corresponds to an amount of current needed to produce a magnetic field that prevents displacement of proof mass 140 in the presence of an acceleration. That is, the electrical signal may correspond to an amount of current needed to rebalance proof mass 140 to a null position in the presence of acceleration. Alternatively or additionally, accelerometer system 100 may include a capacitive accelerometer, in which the electrical signal corresponds to a change of capacitance in a capacitive gap between proof mass 140 and another capacitor plate. Regardless of the accelerometer sensing technology, or combination of technologies, used, the electrical signal generally refers to any electrical signal from which processing circuitry, either included in accelerometer system 100 or external to accelerometer system 100, can determine an acceleration value.

Figure 2A:
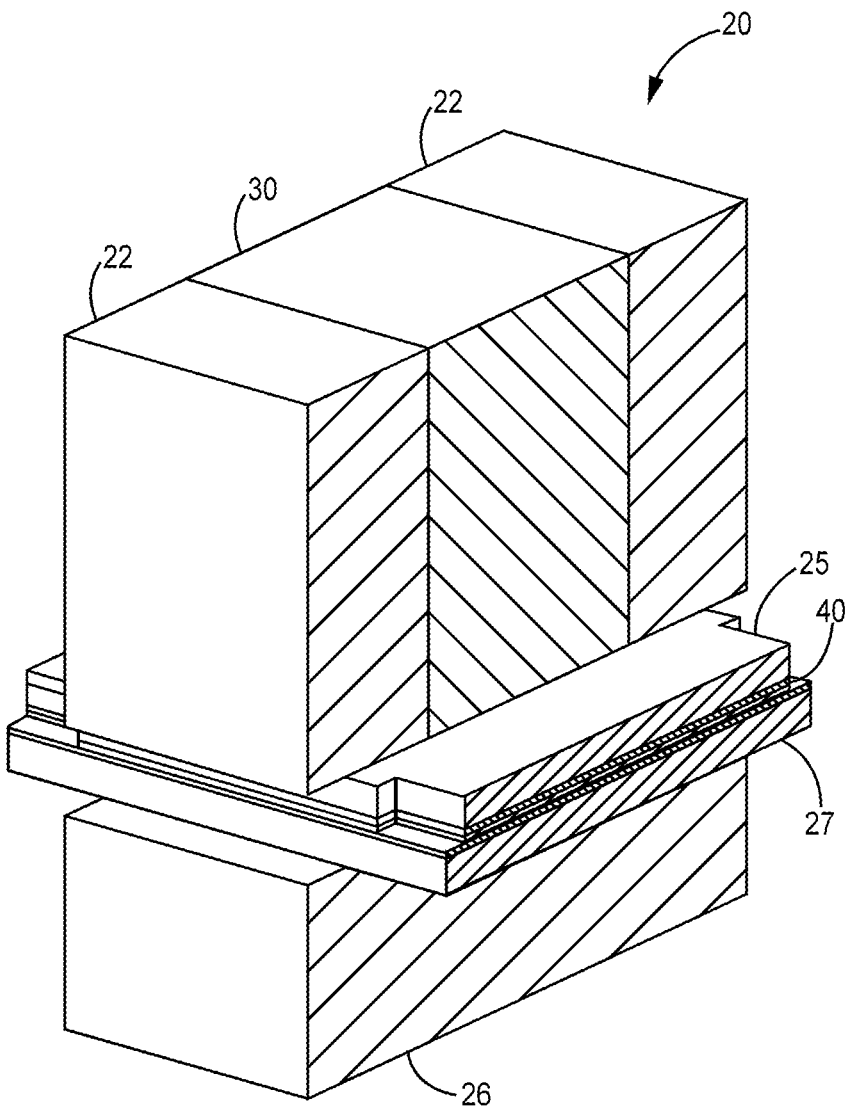
FIG. 2A is a perspective diagram illustrating an example translational mass in-plane MEMS accelerometer.
Figure 2B:
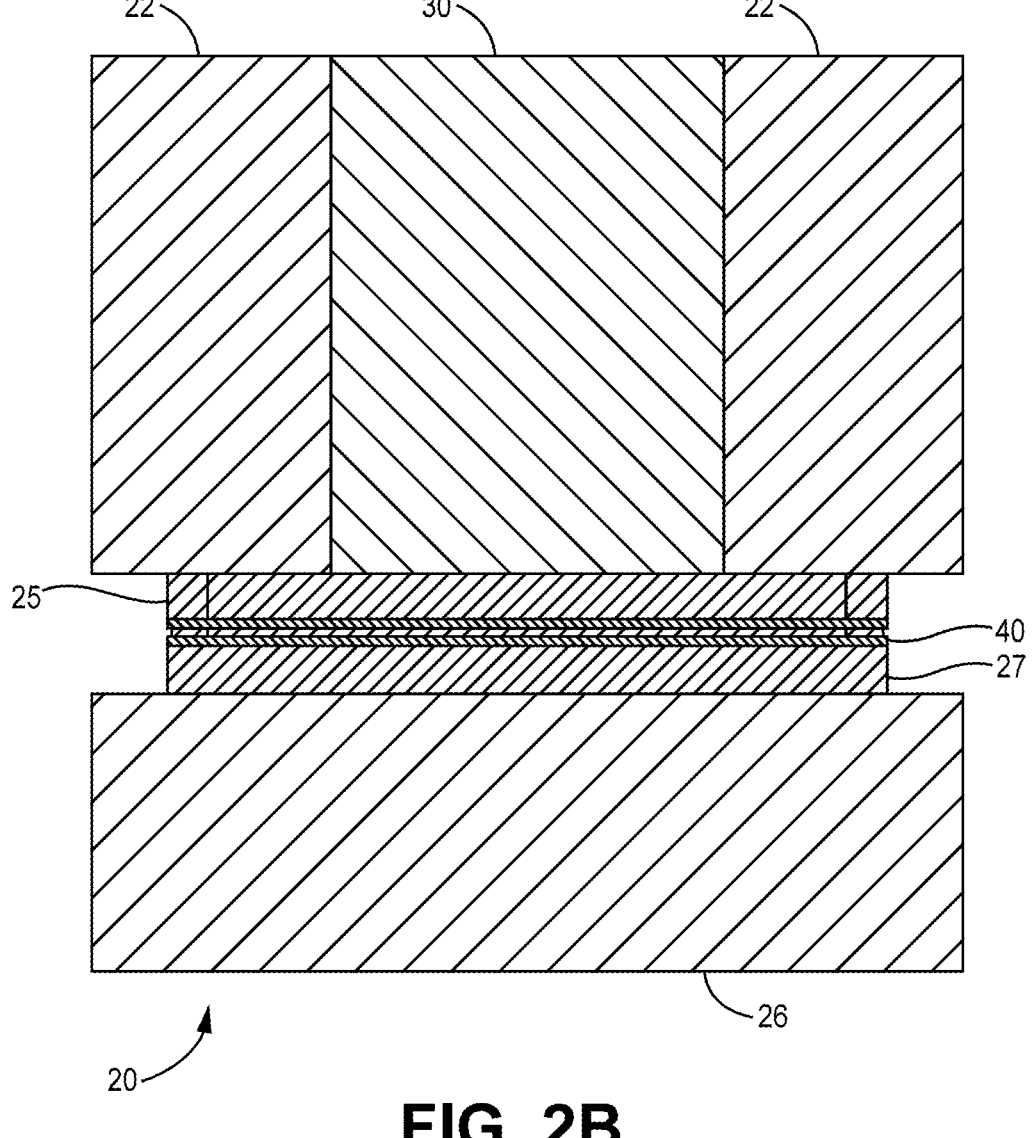
FIG. 2B is a side-view diagram illustrating an example translational mass in-plane MEMS accelerometer.
Figure 2C:
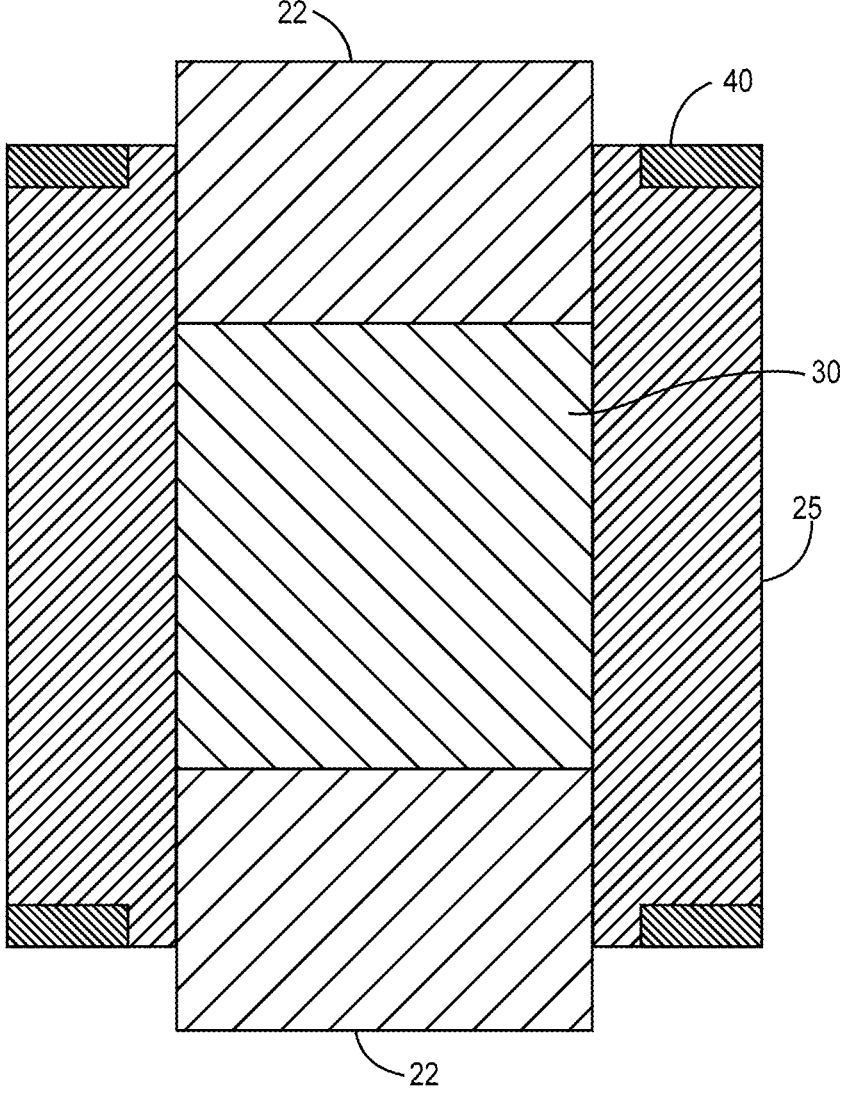
FIG. 2C is a top-view diagram illustrating an example translational mass in-plane MEMS accelerometer.
Figure 2D:
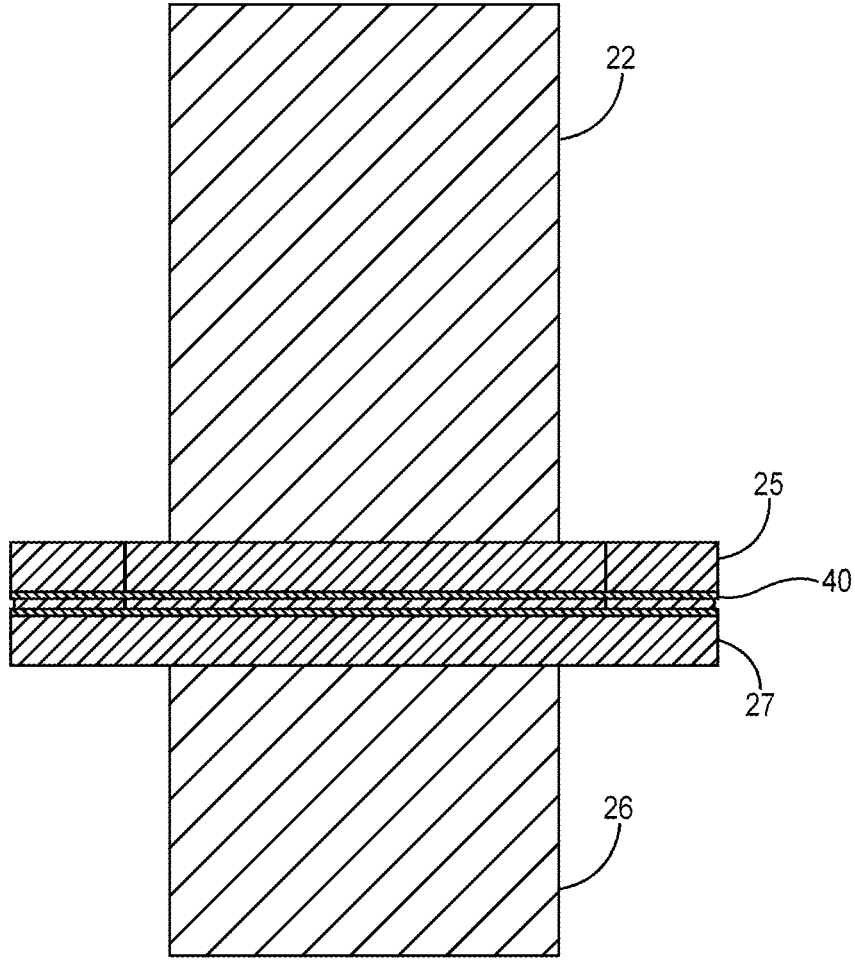
FIG. 2D is an end-view diagram illustrating an example translational mass in-plane MEMS accelerometer.

FIGS. 2A-2D are views illustrating an example translational mass in-plane MEMS accelerometer 20. FIG. 2A is a perspective diagram illustrating an example translational mass in-plane MEMS accelerometer 20. FIG. 2B is a side-view diagram illustrating an example translational mass in-plane MEMS accelerometer 20. FIG. 2C is a top-view diagram illustrating an example translational mass in-plane MEMS accelerometer 20. FIG. 2D is an end-view diagram illustrating an example translational mass in-plane MEMS accelerometer 20. The accelerometer 20 includes a device layer 40 that is attached on each side to a substrate 25, 27. In some examples, substrates 25, 27 are fixed. A magnetic pole-piece layer 22 and a magnetic return path layer 26 are attached to respective substrates 25, 27. A magnet 30 is positioned between each magnetic pole-piece layer 22.

In some examples, device layer 40 may include a proof mass that reacts to motion of the accelerometer 20 along an axis, such as the X-axis. In some examples, the axis may be a Y-axis or the Z-axis. In closed loop operation, an electrical current is applied to the coil traces located on the proof mass creating a Lorentz force on the proof mass as the current passes through the magnetic field flux running between the magnet pole-piece layer 22 and the magnetic return path layer 26 at specific sections of the coil traces. In some examples, the magnetic return path layer 26 may comprise Invar. The electrical current applied to the coil traces on the proof mass is adjusted so that the Lorentz force on the proof mass opposes and balances the acceleration inertial force on the proof mass thereby forcing the proof mass to a null position consistent with a zero-acceleration state. The amount of electrical current being applied is based on the position of the proof mass, which is based on a capacitance sensed by capacitive components formed between the movable proof mass and substrates 25, 27.

Figure 3:
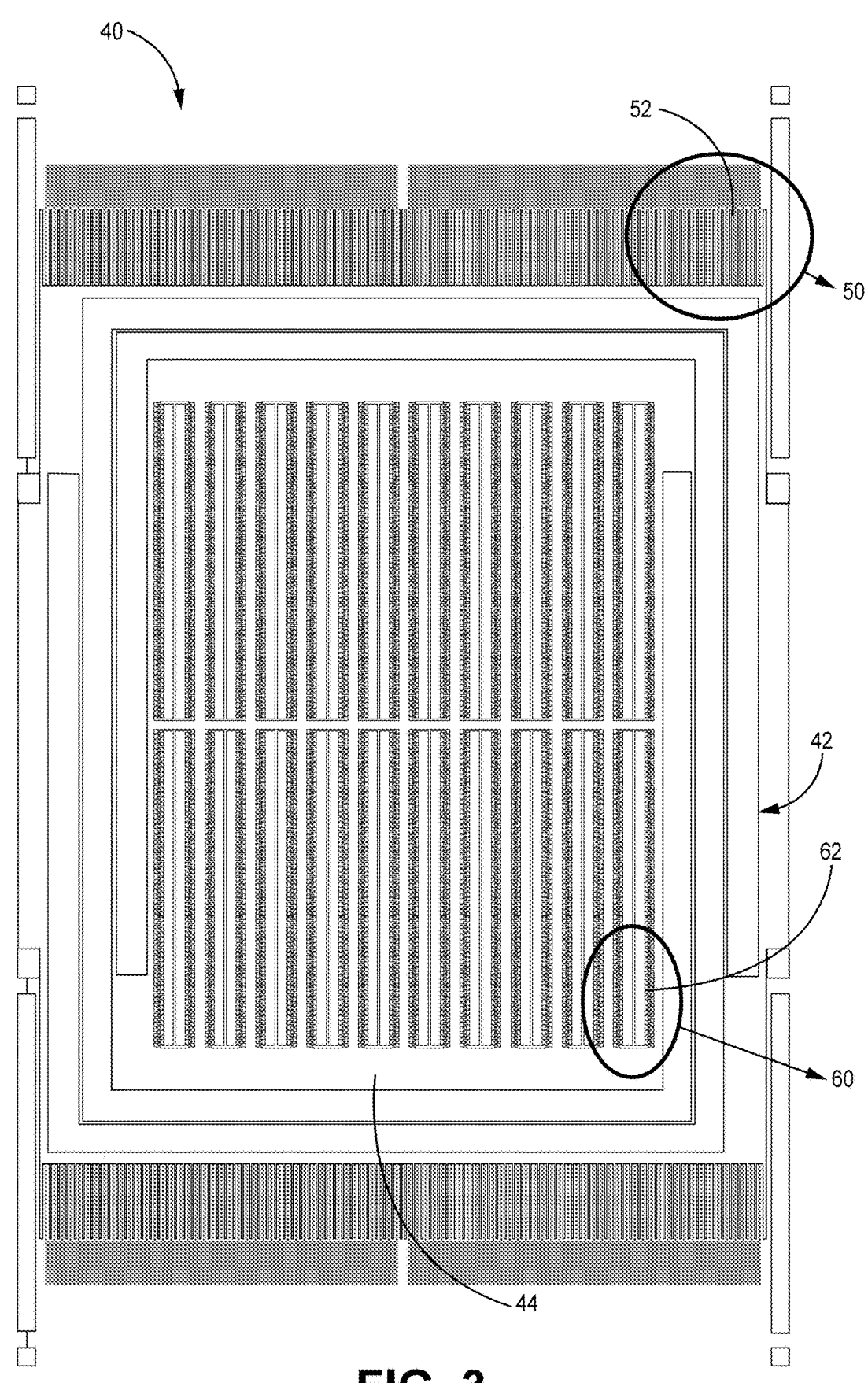
FIG. 3 illustrates a top view of a device layer for an example translational mass in-plane MEMS accelerometer.
Figure 4A:
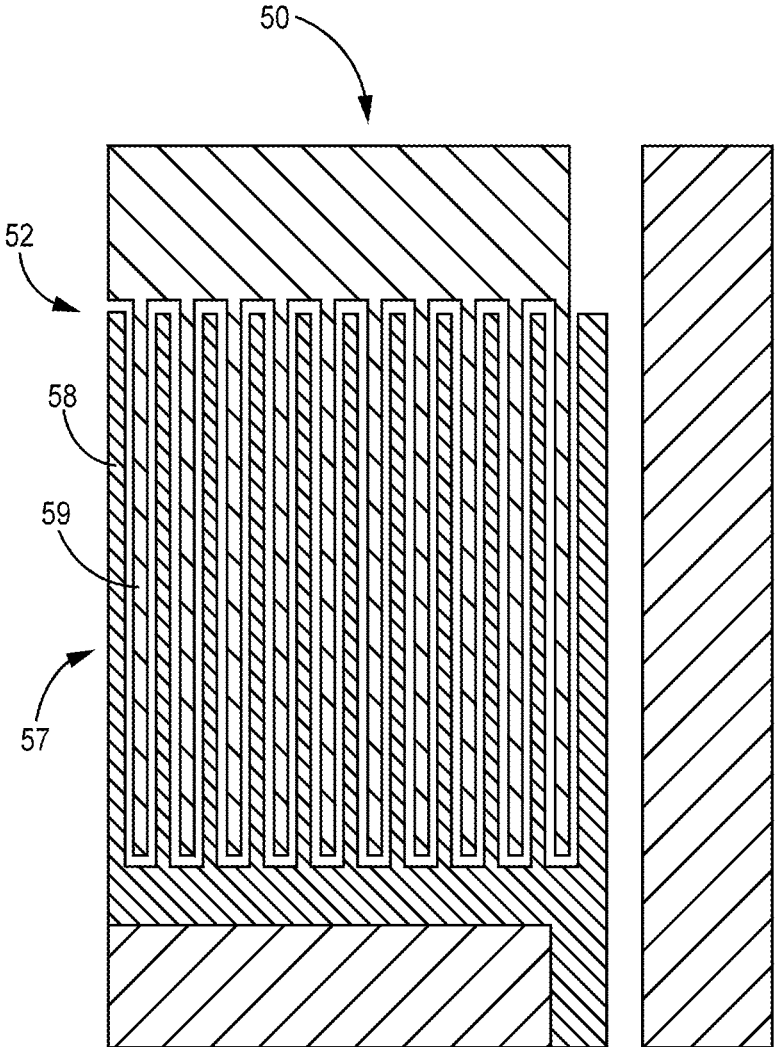
FIG. 4A illustrates a top view of an area of a device layer including a damping comb for an example translational mass in-plane MEMS accelerometer.
Figure 4B:
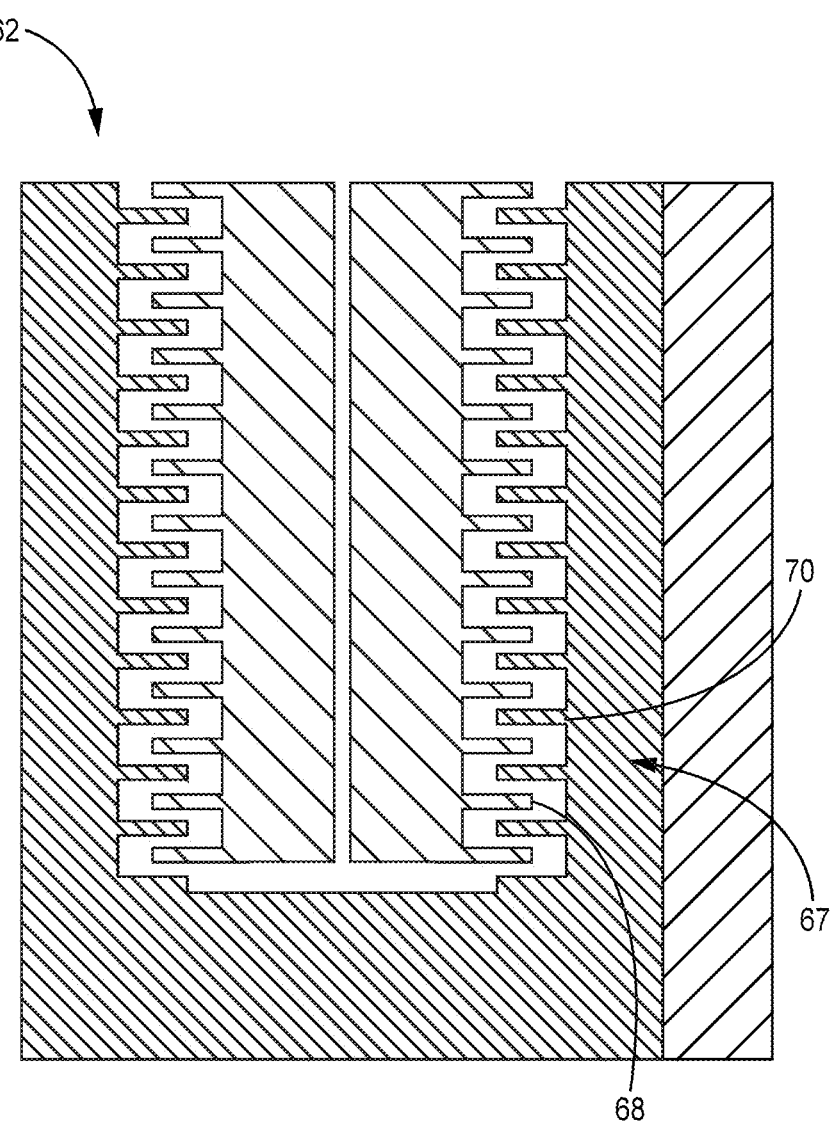
FIG. 4B illustrates a top view of an area of a device layer including a pick-off comb for an example translational mass in-plane MEMS accelerometer.

FIG. 3 illustrates a top view of a device layer 40 for an example translational mass in-plane MEMS accelerometer 20. The device layer 40 includes a proof mass 44. The device layer 40 further includes coil traces 42, an area 50 including damping combs 52, and an area 60 including pickoff combs 62. FIG. 4A illustrates a zoomed-in view of area 50 including damping combs 52. FIG. 4B illustrates a zoomed-in view of area 60 including pickoff combs 62.

The proof mass 44 of the device layer 40 reacts to motion of the accelerometer 20 along an axis, such as the X axis. In closed loop operation, an electrical current is applied to the coil traces 42 located on the proof mass 44 creating a Lorentz force on the proof mass as the current passes through the magnetic field flux running between the magnet pole-piece layer 22 and the magnetic return path layer 26 at specific sections of the coil traces 42. The electrical current applied to the coil traces 42 on the proof mass 44 is adjusted so that the Lorentz force on the proof mass 44 opposes and balances the acceleration inertial force on the proof mass 44 thereby forcing the proof mass 44 to a null position consistent with a zero-acceleration state. The amount of electrical current being applied is based on the position of the proof mass, which is based on a capacitance sensed by capacitive components formed between the movable proof mass 44 and the fixed substrate 25 and 27.

In some examples, proof mass 44 may be connected to a substrate 25, 27 (not shown in FIG. 3) by outer support springs that allow proof mass 44 to move in the plane of the device layer 40 while constrained to move only in a single translation direction. Fabricated as an integral part of the proof mass 44 are one or more conductive coil traces 42. In some examples, the coil traces 42 may be electrically connected to respective inner support conductive springs. In some examples, mounted on outer edges of the proof mass 44 is one or more damping combs 52. In some examples, mounted on the inner region of the proof mass 44 is one or more pick-off combs 62.

Proof mass 44 may be formed using any suitable material. In some examples, proof mass 44 may be made of quartz, fused quartz substrate, or any suitable material useable with a laser-aided etching process, such as selective laser etching, e.g., having a transparency useable with a selective laser etch configured to irradiate the material on a surface of the material or at a depth within the material. In some examples, proof mass 44 may be made of the same material, e.g., crystalline quartz. In some examples, proof mass 44 may be made monolithically from the same material, e.g., etched within and/or from the same substrate and/or blank. In other examples, proof mass 44 may be made of different materials having substantially the same coefficient of thermal expansion (CTE) and assembled and/or attached, e.g., via a laser weld. In some examples, such a laser weld may comprise a selective laser etch, e.g., fusing a portion of two components to attach the components to each other via irradiation by a picosecond and/or femtosecond laser.

In some examples, coil traces 42 are formed on proof mass 44 with selective laser etching. For example, proof mass 44 may comprise single fused quartz, such as fused quartz substrate, and coil traces 42 may be formed by selective laser etching in the proof mass 44.

In some examples, selective laser etching may selectively modify a portion of a material. In some examples, selective laser etching may selectively modify one or more characteristics of a portion of a material. In some examples, the modified portion of the material may be on a surface of the material, within the bulk of the material at a depth and/or distance from a surface of the material, or both. In some examples, the selective laser etching may selectively modify the portion of the material in preparation for removal of the material, e.g., via a subsequent wet-etch process. In some examples, the subsequent wet-etch process may remove the modified portions of the material by placing the treated material being placed in a wet bath, such as hydrofluoric acid or potassium hydroxide. The liquid in the wet bath, such as hydrofluoric acid or potassium hydroxide, may attack the modified portions of the material while not attacking the other portions of the material. For example, the hydrofluoric acid or potassium hydroxide may only attack and remove the portions of the material that were modified by the laser. For example, the selective laser etching may function as a 3D lithographic laser printing where the material, e.g., a fused quartz substrate, functions as a positive-tone resist. In some examples, the selective laser etching may comprise picosecond and/or femtosecond laser radiation, e.g., one or more picosecond and/or femtosecond laser pulses configured to irradiate the portion of the material. In some examples, a laser may modify a portion of the material to be removed by wet-etching, as described above, by applying one or more picosecond and/or femtosecond laser pulses configured to irradiate the portion of the material.

In some examples, performing selective laser etching to form coil traces 42 may remove unwanted material of the fused quartz of proof mass 44. In some examples, proof mass 44 may be coated with a metallization system. In some examples, the metallization system may be Cr—Au. In other examples, the metallization system may be other metallization systems. In some examples, laser ablation of the coating may be performed to form the coil traces 42 and/or electrical connections to linear integrated digitated capacitors.

Forming coil traces 42 in proof mass 44 by selective laser etching may increase an amount of coil traces 42 that are formed in proof mass 44 and may increase a density of coil traces 42 that are formed in proof mass 44. For example, a density of coil traces 42 may be an amount of coil traces per standardized area or volume of proof mass. For example, a density of coil traces 42 formed on proof mass 44 using selective laser etching may be greater than a coil trace density threshold, the coil trace density threshold being a density of coil traces on proof mass using wet-etching, standard laser ablation, and/or standard laser cutting. Unlike, wet-etching, standard laser ablation, and/or standard laser cutting, forming coil traces 42 on proof mass 44 using selective laser etching enables a greater density of coil traces 42 to be formed on proof mass 44. The higher a density of coil traces 42 within the proof mass 44 may help improve the precision of the navigation function by reducing nonlinearities of the accelerometer 20.

In some examples, the scale factor of a force balance accelerometer is linearly related to the number of coil turns interacting with the magnetic field to produce the Lorentz force used to servo the accelerometer. As the number of coil turns increases, the current to servo each G of applied acceleration drops. In some examples, more coil turns corresponds to higher G capability for the accelerometer. In some examples, increasing a density of coil traces 42 formed in the proof mass 44 increases a number of coil turns in the proof mass 44, which leads to a reduction in scale factor.

FIG. 4A illustrates a top view of an area 50 of device layer 40 including a damping comb 52 for an example translational mass in-plane MEMS accelerometer 20. As shown in FIG. 4A, a damping comb 52 may include a plurality of damping comb tines 57. In some examples, damping comb tines 57 may include attached tines 58, and opposing tines 59 attached to the substrate. In some examples, damping comb tines 57 may be used for electrostatic spring softening to reduce the natural frequency of the device.

FIG. 4B illustrates a top view of an area 62 of device layer 40 including a pick-off comb 62 for an example translational mass in-plane MEMS accelerometer 20. As shown in FIG. 4B, a pick-off comb 62 may include a plurality of pick-off comb tines 67. In some examples, the plurality of pick-off comb tines 67 of pick-off comb 62 may include attached tines 68 and opposing tines 70. In some examples, a pick-off comb 62 may include opposing tines 70 that are interleaved with the attached comb tines 68. In some examples, opposing tines 70 may be attached to the substrate.

In some examples, the damping comb tines 57 attached to the proof mass 44 are electrically isolated from the pick-off comb tines 67 located on the proof mass 44. The damping comb tines 57 attached to the proof mass 44 may be electrically connected to a flexure on one of the outer spring elements and the pick-off comb tines 67 attached to the proof mass 44 may be electrically connected to another flexure on the outer support spring 48.

In some examples, damping combs 52 may be formed in proof mass 44 by selective laser etching. Forming damping combs 52 in proof mass 44 by selective laser etching may increase an amount of damping comb tines 57 that are formed in proof mass 44 and may increase a density of damping comb tines 57 that are formed in proof mass 44. For example, a density of damping comb tines 57 may be an amount of pick-off comb tines per standardized area or volume of proof mass. For example, a density of damping comb tines 57 formed on proof mass 44 using selective laser etching may be greater than a damping comb tine density threshold, the damping comb tines density threshold being a density of damping comb tines on proof mass using wet-etching, standard laser ablation, and/or standard laser cutting. In some examples, damping comb tine density threshold may correspond to an amount of damping force that may be generated by the spacing between the damping comb tines 57 and the amount of damping comb tines 57 in a respective damping comb 52.

Unlike, wet-etching, standard laser ablation, and/or standard laser cutting, forming damping comb tines 57 on proof mass 44 using selective laser etching enables a greater density of damping comb tines 57 to be formed on proof mass 44. The higher a density of damping comb tines 57 within the proof mass 44 may help improve the precision of the navigation function by reducing nonlinearities of the accelerometer 20. In some examples, forming damping comb tines 57 on proof mass 44 using selective laser etching enables a greater density of damping comb tines 57 to be formed on proof mass 44 comprised of a fused quartz substrate. In some examples, having a greater density of damping comb tines 57 formed on proof mass 44 comprised of a fused quartz substrate may reduce strains over temperature and, thus, reduce system nonlinearities.

In some examples, pick-off combs 62 may be formed in proof mass 44 by selective laser etching. Forming pick-off comb 62 in proof mass 44 by selective laser etching may increase an amount of pick-off comb tines 67 that are formed in proof mass 44 and may increase a density of pick-off comb tines 67 that are formed in proof mass 44. For example, a density of pick-off comb tines 67 may be an amount of pick-off comb tines per standardized area or volume of proof mass. For example, a density of pick-off comb tines 67 formed on proof mass 44 using selective laser etching may be greater than a pick-off comb tine density threshold, the pick-off comb tines density threshold being a density of pick-off comb tines on proof mass using wet-etching, standard laser ablation, and/or standard laser cutting. In some examples, pick-off comb tine density threshold may correspond to an amount of capacitance that may be generated by the spacing between the pick-off comb tines 67 and the amount of pick-off comb tines 67 in a respective pick-off comb 62.

Unlike, wet-etching, standard laser ablation, and/or standard laser cutting, forming pick-off comb tines 67 on proof mass 44 using selective laser etching enables a greater density of pick-off comb tines 67 to be formed on proof mass

44. The higher a density of pick-off comb tines 67 within the proof mass 44 may help improve the precision of the navigation function by reducing nonlinearities of the accelerometer 20. In some examples, using selective laser etching to have a greater density of pick-off comb tines 67 formed on proof mass 44 comprised of a fused quartz substrate may avoid or reduce the 1/D effect.

In one or more examples, the accelerometers described herein may utilize hardware, software, firmware, or any combination thereof for achieving the functions described. Those functions implemented in software may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure.

Instructions may be executed by one or more processors within the accelerometer or communicatively coupled to the accelerometer. The one or more processors may, for example, include one or more DSPs, general purpose microprocessors, application specific integrated circuits ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for performing the techniques described herein. Also, the techniques could be fully implemented in one or more circuits or logic elements.

The techniques of this disclosure may be implemented in a wide variety of devices or apparatuses that include integrated circuits (ICs) or sets of ICs (e.g., chip sets). Various components, modules, or units are described in this disclosure to emphasize functional aspects of devices configured to perform the disclosed techniques, but do not necessarily require realization by different hardware units. Rather, various units may be combined or provided by a collection of interoperative hardware units, including one or more processors as described above, in conjunction with suitable software and/or firmware.

Figure 5:
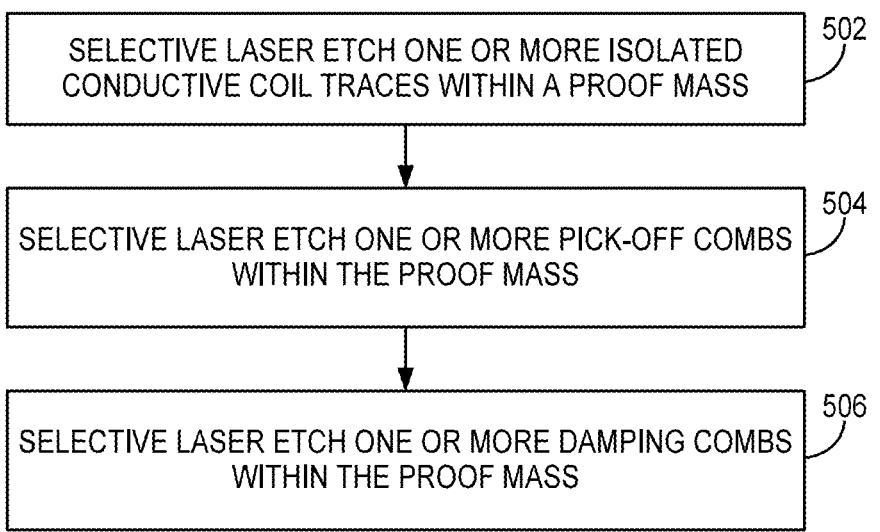
FIG. 5 is a flow diagram illustrating an example technique of making a proof mass.

FIG. 5 is a flow diagram illustrating an example technique of making a device layer 40 and/or proof mass 44. FIG. 5 is described with respect to device layer 40 and/or proof mass 44 of FIGS. 2-4. However, the techniques of FIG. 5 may be utilized to make different device layers, proof masses and/or additional or alternative accelerometer systems.

In some examples, a manufacturer may selective laser etch one or more coil traces 42 within proof mass 44 (502). For example, the manufacturer may selective laser etch a density of coil traces 42 on proof mass 44 greater than a coil trace density threshold.

In some examples, the manufacturer may selective laser etch one or more pick-off combs 62 within the proof mass 44 (504). For example, the one or more pick-off combs 62 comprises a plurality of pick-off comb tines 67. In some examples, manufacturer may selective laser etch a density of pick-off comb tines 67 on proof mass 44 greater than a pick-off comb tine density threshold.

In some examples, the manufacturer may selective laser etch one or more damping combs 52 within the proof mass 44 (506). For example, the one or more damping combs 52 comprises a plurality of damping comb tines 57. In some examples, a manufacturer may selective laser etch a density of damping comb tines 57 on proof mass 44 greater than a damping comb tine density threshold.

Additional method and devices of the disclosure are described in the following aspects.

Example 1: A Micro Electro-Mechanical Systems (MEMS) accelerometer device includes a proof mass comprising at least one of one or more isolated conductive coil traces or one or more pick-off combs within the proof mass, the one or more pick-off combs comprising a plurality of pick-off comb tines; a pole-piece layer coupled to the proof mass; and a return-path layer coupled to the proof mass, wherein the at least one of the one or more isolated conductive coil traces or the one or more pick-off combs are formed by selective laser etching.

Example 2: The MEMS accelerometer device of example 1, wherein the proof mass comprises the one or more isolated conductive coil traces within the proof mass, and wherein the one or more isolated conductive coil traces are formed by selective laser etching.

Example 3: The MEMS accelerometer device of example 2, wherein a density of the one or more isolated conductive coil traces within the proof mass is greater than a coil trace density threshold.

Example 4: The MEMS accelerometer device of any of examples 1 through 3, wherein the proof mass comprises the one or more pick-off comb traces within the proof mass, and wherein the one or more pick-off combs are formed by selective laser etching.

Example 5: The MEMS accelerometer device of example 4, wherein a density of the pick-off comb tines of the one or more pick-off combs within the proof mass is greater than a pick-off comb tine density threshold.

Example 6: The MEMS accelerometer device of any of examples 1 through 5, wherein the proof mass comprises the one or more isolated conductive coil traces and the one or more pick-off combs, and wherein the one of the one or more isolated conductive coil traces and the one or more pick-off combs are formed by selective laser etching.

Example 7: The MEMS accelerometer device of example 6, wherein a density of the pick-off comb tines of the one or more pick-off combs within the proof mass is greater than a pick-off comb tine density threshold.

Example 8: The MEMS accelerometer device of example 7, wherein a density of the one or more isolated conductive coil traces within the proof mass is greater than a coil trace density threshold.

Example 9: The MEMS accelerometer device of any of examples 6 through 8, wherein a density of the one or more isolated conductive coil traces within the proof mass is greater than a coil trace density threshold.

Example 10: The MEMS accelerometer device of any of examples 1 through 9, the proof mass further comprising one or more damping combs within the proof mass, the one or more damping combs comprising a plurality of damping comb tines, wherein the one or more damping combs are formed by selective laser etching.

Example 11: The MEMS accelerometer device of example 10, wherein a density of the damping comb tines of the one or more damping combs within the proof mass is greater than a damping comb tine density threshold.

Example 12: The MEMS accelerometer device of any of examples 1 through 11, wherein the proof mass comprises a quartz substrate.

Example 13: The MEMS accelerometer device of example 12, wherein the quartz substrate is a fused quartz substrate.

Example 14: A method includes selective laser etching one or more isolated conductive coil traces within a proof mass; and selective laser etching one or more pick-off combs within the proof mass, the one or more pick-off combs comprising a plurality of pick-off comb tines.

Example 15: The method of example 14, wherein the proof mass comprises a quartz substrate.

Example 16: The method of example 15, wherein the quartz substrate is a fused quartz substrate.

Example 17: The method of any of examples 14 through 16, further includes selective laser etching a density of the one or more isolated conductive coil traces within the proof mass greater than a coil trace density threshold.

Example 18: The method of any of examples 14 through 17, further includes selective laser etching a density of the pick-off comb tines of the one or more pick-off combs within the proof mass greater than a pick-off comb tine density threshold.

Example 19: The method of any of examples 14 through 18, further includes selective laser etching one or more damping combs within the proof mass, the one or more damping combs comprising a plurality of damping comb tines.

Example 20: The method of example 19, further includes selective laser etching a density of the damping comb tines of the one or more damping combs within the proof mass greater than a damping comb tine density threshold.

The techniques described in this disclosure may be implemented, at least in part, in hardware, software, firmware, or any combination thereof. For example, various aspects of the described techniques may be implemented within one or more processors, including one or more microprocessors, DSPs, ASICs, FPGAs, or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A Micro Electro-Mechanical Systems (MEMS) accelerometer device comprising:
   a proof mass comprising at least one of one or more isolated conductive coil traces or one or more pick-off combs within the proof mass, the one or more pick-off combs comprising a plurality of pick-off comb tines;
   a pole-piece layer coupled to the proof mass; and
   a return-path layer coupled to the proof mass,
   wherein the at least one of the one or more isolated conductive coil traces or the one or more pick-off combs are formed by selective laser etching.

2. The MEMS accelerometer device of claim 1, wherein the proof mass comprises the one or more isolated conductive coil traces within the proof mass, and
   wherein the one or more isolated conductive coil traces are formed by selective laser etching.

3. The MEMS accelerometer device of claim 2, wherein a density of the one or more isolated conductive coil traces within the proof mass is greater than a coil trace density threshold.

4. The MEMS accelerometer device of claim 1, wherein the proof mass comprises the one or more pick-off comb traces within the proof mass, and
   wherein the one or more pick-off combs are formed by selective laser etching.

5. The MEMS accelerometer device of claim 4, wherein a density of the pick-off comb tines of the one or more pick-off combs within the proof mass is greater than a pick-off comb tine density threshold.

6. The MEMS accelerometer device of claim 1, wherein the proof mass comprises the one or more isolated conductive coil traces and the one or more pick-off combs, and
   wherein the one of the one or more isolated conductive coil traces and the one or more pick-off combs are formed by selective laser etching.

7. The MEMS accelerometer device of claim 6, wherein a density of the pick-off comb tines of the one or more pick-off combs within the proof mass is greater than a pick-off comb tine density threshold.

8. The MEMS accelerometer device of claim 7, wherein a density of the one or more isolated conductive coil traces within the proof mass is greater than a coil trace density threshold.

9. The MEMS accelerometer device of claim 6, wherein a density of the one or more isolated conductive coil traces within the proof mass is greater than a coil trace density threshold.

10. The MEMS accelerometer device of claim 1, the proof mass further comprising one or more damping combs within the proof mass, the one or more damping combs comprising a plurality of damping comb tines,
   wherein the one or more damping combs are formed by selective laser etching.

11. The MEMS accelerometer device of claim 10, wherein a density of the damping comb tines of the one or more damping combs within the proof mass is greater than a damping comb tine density threshold.

12. The MEMS accelerometer device of claim 1, wherein the proof mass comprises a quartz substrate.

13. The MEMS accelerometer device of claim 12, wherein the quartz substrate is a fused quartz substrate.

14. A method comprising:
   selective laser etching one or more isolated conductive coil traces within a proof mass; and
   selective laser etching one or more pick-off combs within the proof mass, the one or more pick-off combs comprising a plurality of pick-off comb tines.

15. The method of claim 14, wherein the proof mass comprises a quartz substrate.

16. The method of claim 15, wherein the quartz substrate is a fused quartz substrate.

17. The method of claim 14, further comprising:
   selective laser etching a density of the one or more isolated conductive coil traces within the proof mass greater than a coil trace density threshold.

18. The method of claim 14, further comprising:
   selective laser etching a density of the pick-off comb tines of the one or more pick-off combs within the proof mass greater than a pick-off comb tine density threshold.

19. The method of claim 14, further comprising:
   selective laser etching one or more damping combs within the proof mass, the one or more damping combs comprising a plurality of damping comb tines.

20. The method of claim 19, further comprising:
   selective laser etching a density of the damping comb tines of the one or more damping combs within the proof mass greater than a damping comb tine density threshold.

* * * * *